United States Patent

Sparks et al.

Patent Number: 5,379,267
Date of Patent: Jan. 3, 1995

[54] BUOYANCY CONTROL SYSTEM

[75] Inventors: David C. Sparks, Lansing; Luke Belfie, Gilletts Lake; Dave Bruder, Jackson; Christian T. Werner, Clark Lake; James W. Widenhofer, Jackson, all of Mich.

[73] Assignee: Sparton Corporation, Jackson, Mich.

[21] Appl. No.: 147,903

[22] Filed: Nov. 4, 1993

Related U.S. Application Data

[63] Continuation of Ser. No. 833,987, Feb. 11, 1992, abandoned.

[51] Int. Cl.$^6$ ............................................. G01V 1/38
[52] U.S. Cl. ............................. 367/18; 73/170.34; 441/28
[58] Field of Search ............... 367/17, 18, 140; 441/7, 441/9, 10, 28, 29; 73/170.34

[56] References Cited

U.S. PATENT DOCUMENTS

| | | | |
|---|---|---|---|
| 3,126,559 | 3/1964 | Alexander | 9/10 |
| 3,193,853 | 7/1965 | Alexander | 9/8 |
| 3,228,369 | 1/1966 | Warhurst et al. | 114/6 |
| 3,520,263 | 7/1970 | Berry et al. | 441/29 X |
| 3,628,205 | 12/1971 | Starkey et al. | 367/2 |
| 3,909,774 | 9/1975 | Pavey, Jr. | 367/18 |
| 3,921,120 | 11/1975 | Widenhofer | 340/2 |
| 4,031,581 | 6/1977 | Baugh | 441/29 |
| 4,121,529 | 10/1978 | Smith et al. | 441/29 X |
| 4,202,036 | 5/1980 | Bowditch et al. | 441/29 X |
| 4,266,500 | 5/1981 | Jurca | 441/29 X |
| 4,554,826 | 11/1985 | Barry | 73/170.34 |
| 4,745,583 | 5/1988 | Motal | 367/18 |
| 4,854,728 | 8/1989 | Baron et al. | 73/170.34 |
| 5,283,767 | 2/1994 | McCoy | 367/4 |

Primary Examiner—J. Woodrow Eldred
Attorney, Agent, or Firm—Reising, Ethington, Barnard, Perry & Milton

[57] ABSTRACT

A buoyancy control system is disclosed for maintaining a buoyant vehicle at a controlled depth by jettisoning either a heavy liquid or a light liquid. The control system monitors the depth of the buoyant vehicle and determines the direction and magnitude of vertical velocity. If it exceeds the threshold velocity the system calculates how much fluid to jettison in order to decelerate the vehicle to a target velocity. The positive and negative threshold velocities are programmed for control of the average vertical velocity and for depth maintenance. First and second bladders contain heavy and light liquids, respectively. The bladders are subjected to ambient water pressure and are spring loaded and each is provided with an discharge valve. A pressure sensor monitors the vehicle depth and generates a depth signal. A computer derives a velocity signal from the depth signal and calculates the quantity of liquid which should be jettisoned.

15 Claims, 4 Drawing Sheets

BUOYANCY CONTROL SYSTEM

This application is a continuation-in-part, continuation, of application Ser. No. 07/833,987, filed Feb. 11, 1992, abandoned Feb. 17, 1994.

FIELD OF THE INVENTION

This invention relates to buoyancy control systems and more particularly, it relates to a buoyancy control system for a submerged vehicle.

BACKGROUND OF THE INVENTION

In the field of oceanography and in underwater exploration, there is a need for supporting a payload, such as a transducer, at controlled underwater depths. In some applications, it is desired to control the buoyancy of a submerged vehicle so that the transducer carried by it is moved through a range of depths at a predetermined average vertical velocity. In other applications it may be desired to maintain a transducer at a predetermined depth, within tolerances, for a given period of time.

A particular application of buoyancy control systems is that of controlling the depth of a sonobuoy hydrophone of the type, for example, which is used for detection of submarines. Sonobuoys are typically launched from an aircraft or a ship and upon entering the water, the sonobuoy components are deployed from a casing. A sonobuoy with a hydrophone which is to be operated at a controlled depth may include a buoyant vehicle with a buoyancy control system.

In the prior art, it has been proposed to achieve depth control of such buoyant vehicles by selectively jettisoning a first liquid having a specific gravity greater than the seawater and a second liquid having a specific gravity less than seawater. However, the prior art systems have certain disadvantages in structure and operation.

Sonobuoys, especially those used for submarine detection, are expendable devices and must meet stringent requirements. Such sonobuoys must be of compact structure and must be of low manufacturing cost. In operation, the buoyancy control system must maintain controlled depth for a long period of time with a high degree of accuracy and with the consumption of only a small amount of energy. It should be readily programmable for selected operating depths. It also should operate at low noise to avoid interference with the detection system.

A general object of this invention is to provide an improved buoyancy control system for a submerged buoyant vehicle which overcomes certain disadvantages of the prior art.

SUMMARY OF THE INVENTION

In accordance with this invention, an improved buoyancy control system is provided for a buoyant vehicle which is of compact structure and relatively low manufacturing cost. It is capable of maintaining a controlled range of depth for a long time period with low energy consumption. The buoyancy control system operates with minimal noise generation which would interfere with hydrophone signal detection. Additionally, the system is readily programmable for operation at a selected one of several depth ranges.

Further, in accordance with this invention, a buoyancy control system is provided which seeks to control the vertical velocity of a buoyant vehicle at a predetermined target velocity when it reaches a specified depth within a predetermined depth range or zoom window. The buoyancy control system monitors the depth of the buoyant vehicle and determines the direction and magnitude of the vertical velocity. If the velocity exceeds a predetermined threshold velocity the system calculates how much fluid to jettison in order to decelerate the vehicle to the target velocity. Thus, the buoyancy control system operates to control the maximum velocities, either descending or ascending, so as to stay within the predetermined threshold velocity. Further, the values of the positive and negative threshold velocities may be programmed through the range of depths in the zoom window to have a predetermined ratio for control of the average vertical velocity and for depth maintenance.

Further, in accordance with this invention, a buoyant vehicle with adjustable buoyancy is operated at controlled depth by the steps of measuring the depth of the vehicle in the body of water, determining the velocity of direction of vehicle relative to the surface of the water, determining whether the velocity exceeds a predetermined threshold value, and, after the vehicle has reached a desired depth, changing the velocity of the vehicle by adjusting its buoyancy to reduce it below the threshold value. Further, the desired depth is selected to be within one of a plurality of zoom ranges of depth to permit high resolution of depth and velocity measurement.

Further, in accordance with this invention, apparatus is provided for controlling depth of a buoyant vehicle comprising first and second bladders containing, respectively, liquids having specific gravity greater than and less than that of the water, the bladder is being subjected to the ambient pressure of the water, means for generating a depth signal and means for generating a velocity signal, and means responsive to the depth and velocity signal to jettison controlled quantities selectively of said liquids to adjust the buoyancy of the vehicle.

A complete understanding of this invention may be obtained from the detailed description that follows taken with the accompanying drawings.

BEST MODE FOR CARRYING OUT THE INVENTION

Referring now to the drawings, there is shown an illustrative embodiment of the invention in a buoyancy control system for use in a sonobuoy. In this illustrative embodiment, the buoyancy control system is adapted to maintain the hydrophone of the sonobuoy within one of plural ranges of depth for at least a predetermined time interval by control of vertical velocity within the depth range. It will be appreciated as the description proceeds that the invention is useful in other applications and may be realized in different embodiments.

Introduction To Best Mode

The buoyancy control system of this invention is incorporated in a submersible vehicle which itself is provided with variable buoyancy under control of the buoyancy control system. The submersible vehicle carries a payload in the form of a hydrophone and a hydrophone suspension system which are external of the submersible vehicle. The submersible vehicle may exhibit negative, neutral or positive buoyancy as determined by the buoyancy control system of the invention. The submersible vehicle with adjustable buoyancy is referred to herein, for convenience, as the "buoyant vehicle".

Figure 1A:
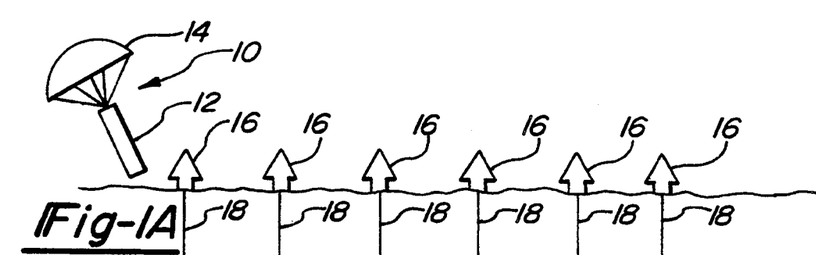
FIGS. 1A through 1G show the deployment sequence of a sonobuoy with the buoyancy control system of this invention.
Figure 1B:
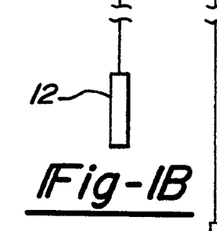
Figures 1C, 1D, 1E, 1F, 1G:
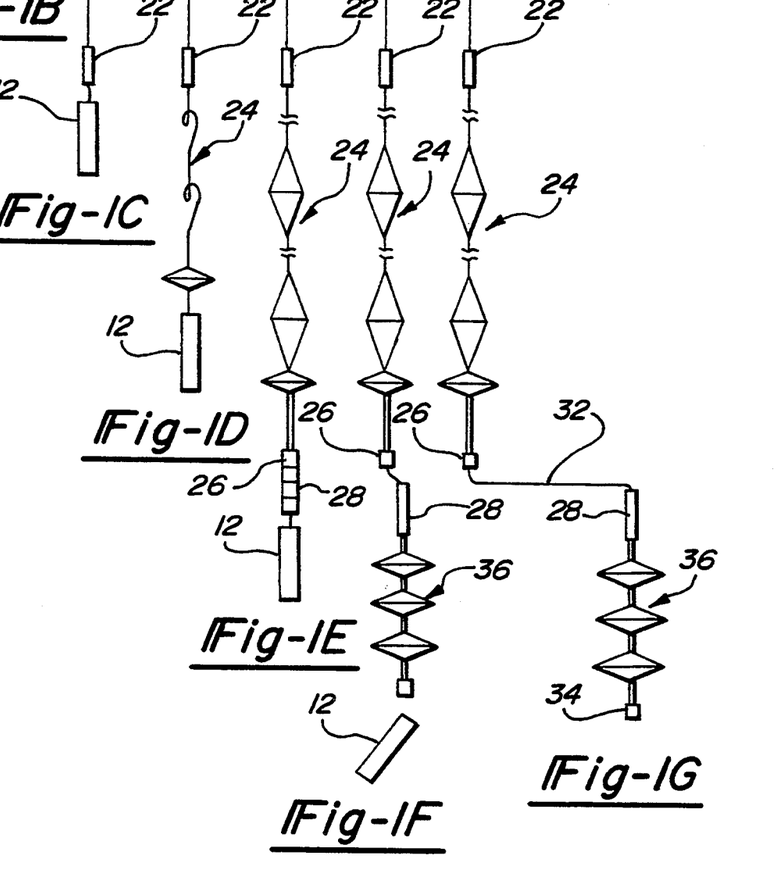

Before describing the buoyancy control system of this invention, it will be helpful to consider its relationship to the sonobuoy with which it is used in the illustrative embodiment. FIG. 1 illustrates a sonobuoy 10, in schematic fashion, and the deployment sequence of the sonobuoy components after it is launched from an aircraft over the ocean. The sonobuoy 10 comprises a descent vehicle having a cylindrical casing 12. When it is launched from the aircraft, a parachute 14 opens and slows its descent to reduce the impact forces at the surface of the water. After the impact with the water, a float 16 is inflated and the parachute 14 is released from the casing. The float 16 carries a radio transmitter and antenna. The casing 12 falls away from the float 16 and a cable 18 connected with the float is pulled out of the casing 12. The cable 18 is a signal conductor and also serves as a support line. At a certain depth of the casing 12, a suspension housing 22, which is connected to the cable 18, is pulled from the casing 12. Then, a compliance and drogue assembly 24 having its upper end connected to the housing 22 is deployed from the housing 22. After deployment from the housing, the drogue is erected and pulls a cable spool 26, which is connected with the assembly 24, and a buoyant vehicle 28 from the casing 12. The spool 26 is supported by the float 16 at a fixed depth which is less than the depth range in which the buoyant vehicle 28 is to operate. The spool 26 is wound with a signal cable 32, suitably a fiber optic cable, having its free end connected with the buoyant vehicle 28 and tethering it to the spool 26 as a slack line. When the casing 12 clears the buoyant vehicle 28, a transducer, i.e. a hydrophone 34, having negative buoyancy, is released from the vehicle 28 and falls away from the vehicle. The hydrophone 34 is connected with the vehicle by a suspension system 36 which supports it at a fixed distance below the buoyant vehicle 28.

When the components of the sonobuoy 10 are deployed in the water as described above, the sonobuoy is capable of becoming operational. However, it will not be switched to an operational state until the hydrophone 34 has reached the prescribed depth range as will be described subsequently. When the sonobuoy does become operational, the hydrophone 34 detects underwater sound pressure waves and generates a corresponding electrical signal which is transmitted to an electronic circuit in the buoyant vehicle 28 through a signal conductor extending through the suspension system 36. The buoyant vehicle 28 is tethered through the cable 32 to the cable spool 26. The cable is paid out as needed from the spool to allow the buoyant vehicle 28 to descend to its prescribed depth range while allowing lateral drift of the vehicle. Signal conductors extend upwardly from the spool 26 through the compliance and drogue assembly 24 to the housing 22 and thence to cable 18 and the transmitter in the float 16 whereby the hydrophone signals are transmitted by radio to a remote receiver. An example of a sonobuoy suspension system for supporting the spool 26 is described in Widenhofer Pat. No. 3,921,120 which is assigned to the assignee of this invention.

General Function of the Buoyant Vehicle

As described above, the buoyant vehicle 28 is adapted to support the hydrophone 34 through the suspension system 36; further, it is required to support a share of the weight of the fiber optic cable 32 which will vary according to the amount of cable that is paid out from the spool 26. The primary function of the buoyant vehicle 28 is to maintain the hydrophone 34 below a predetermined maximum vertical velocity through a given depth range or to hold it, within tolerances, at a predetermined depth. As will be described below, this is accomplished by controlling the net buoyancy of the vehicle 28.

In the illustrative embodiment of the invention, the buoyant vehicle 28 controls the vertical velocity of the hydrophone 34 to maintain a predetermined average value within a specified depth range in the ocean. It not only maintains an average velocity but keeps maximum velocities within predetermined thresholds. There are three specified depth ranges which herein are called shallow, intermediate and deep. In particular, the shallow range is a depth of 0 to 256 feet, the intermediate range is 359 to 615 feet and the deep range is from 856 to 1,112 feet.

In the illustrative embodiment, a pressure transducer is used for measuring the depth of the buoyant vehicle beneath the surface of the water. The pressure transducer is of a known design, specifically, a Keller Model PA-9-50 with an operating range up to 725 PSI. The output signal voltage of the transducer increases with pressure at a known calibrated rate. When the signal voltage is amplified to a full scale reading, at a depth of 1632 feet, the A/D converter in the system results in a resolution of twelve inches for the full scale mode of operation. Accuracy is estimated at about ±2.1 feet. With this instrumentation, the depth of the buoyant vehicle can be measured throughout the full scale range of 0 to 1632 feet which encompasses all of the three operating depth ranges.

For efficient performance, the buoyancy control system must keep the vertical velocity of the buoyant vehicle as low as possible within the selected depth range. This requires a high degree of resolution of depth measurement. The resolution obtained by using the full scale reading is not high enough for the buoyancy control system to achieve the desired efficiency. The required resolution can be obtained provided that the buoyant vehicle is operated within a restricted range of depths such as a selected one of the shallow, intermediate or deep depth ranges. With each of these dynamic ranges being limited to 256 feet, an offset may be applied in signal processing against the analog signal of the pressure transducer according to the upper end of the depth range and the same A/D converter will produce a depth signal of much higher resolution. Additional gain is also applied to the signal after the offset is applied. Accordingly, in the illustrative embodiment of the invention, the buoyancy control system is operated in a different offset mode, herein referred to as a "zoom mode" for each of the shallow, intermediate and deep depth ranges. It will be understood, of course, that the buoyancy control system can be designed to operate over depth ranges different from those discussed above. In the illustrative embodiment, operation in one of the three zoom modes achieves an efficiency of performance high enough to enable the buoyant vehicle to stay within the selected depth range long enough to accomplish a desired purpose, for example, for an eight hour period.

Description Of The Buoyant Vehicle

Figures 2, 3, 4:
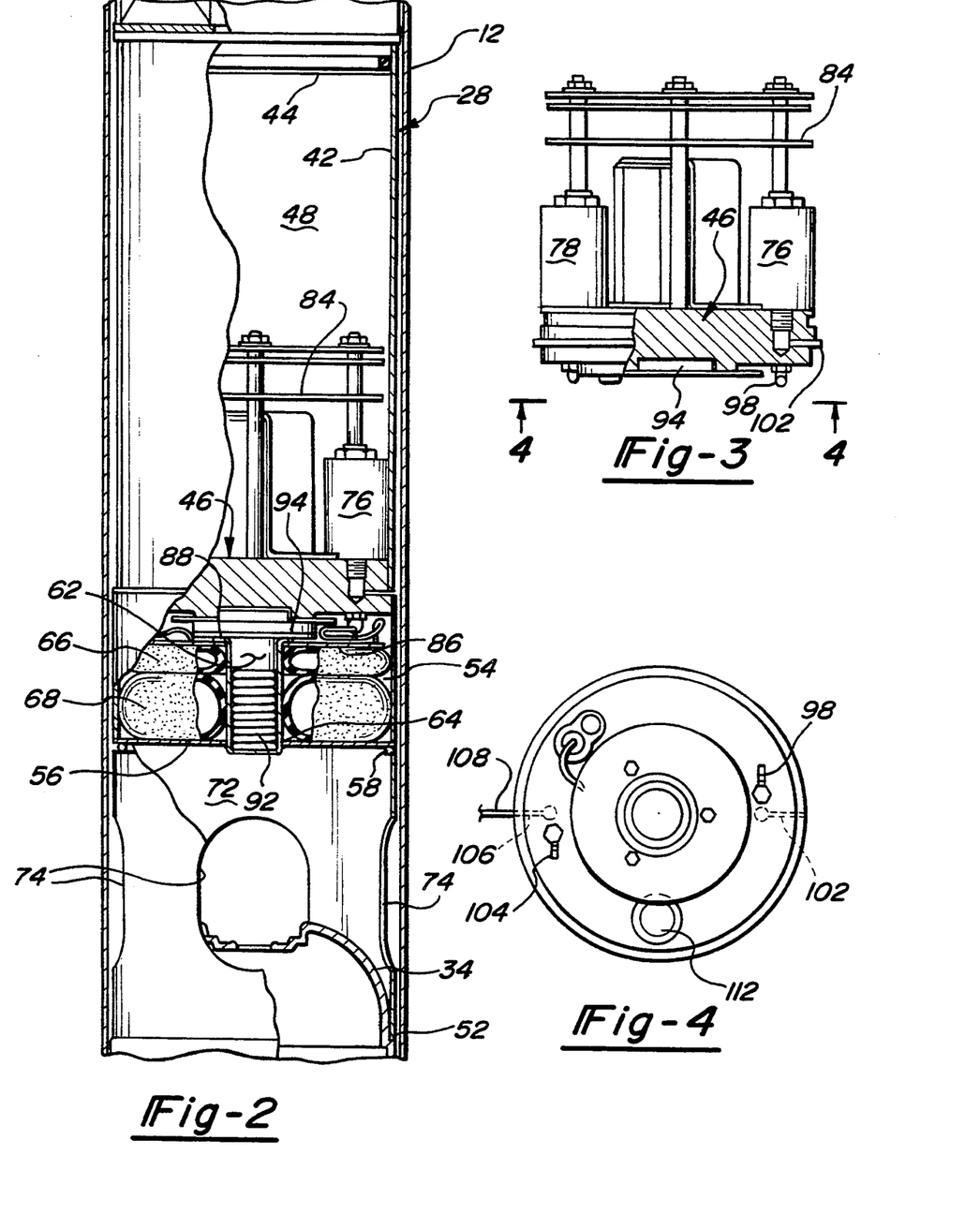
FIG. 2 shows a fragmentary view of a sonobuoy with the buoyant vehicle of this invention inside the casing.
FIG. 3 shows a portion of the buoyant vehicle in greater detail.
FIG. 4 is a view taken on line 4—4 of FIG. 3.

The buoyant vehicle 28 is carried in the lower end of the casing 12 and is shown in detail in FIGS. 2, 3 and 4. The buoyant vehicle 28 comprises a cylindrical body 42 which is closed at its upper end by a watertight bulkhead 44. Another bulkhead 46, also watertight, is provided intermediate the upper and lower ends of the body 42 to provide a sealed upper chamber 48. The cylindrical body 42 extends below the intermediate bulkhead 46 and terminates in an open end 52 which receives the upper end of the hydrophone 34. A bladder compartment 54 in the cylindrical body 42 is defined between the bulkhead 46 and a compartment wall 56. The compartment wall 56 is supported on the cylindrical body 42 by plural in-turned tabs 58. A cylindrical plunger 62 of inverted cup-shape is disposed centrally on the axis of the cylindrical body 42 and extends through a circular opening 64 in the compartment wall 56. The bladder compartment 54, of annular shape, is occupied by a pair of annular bladders 66 and 68 which are disposed around the plunger 62 in axial alignment with each other and coaxial with the cylindrical body 42. The bladder 66 is suitably of smaller volume than bladder 68 and is filled with a liquid having a specific gravity greater than that of seawater, i.e. a heavy liquid. The heavy liquid is preferably Fluorinert available from 3M Corporation of Minneapolis, Minn. and has a specific gravity of 1.85. The bladder 68 is filled with a liquid having a specific gravity less than that of seawater, i.e. a light liquid. The system may be designed with bladders 66 and 68 of equal size, if desired. The light liquid is preferably alcohol with a specific gravity of 0.78. A storage compartment 72 is provided between the wall 56 and the upper end of the hydrophone 34. The suspension system 36 (not shown in FIG. 2) is housed in the compartment 72 prior to deployment from the cylindrical body 42. This compartment 72 is provided with plural openings 74 and is flooded when the body 42 is submerged. Similarly bladder compartment 54 is open to the seawater and is flooded when submerged.

The bladders 66 and 68 both have a flexible wall constructed of urethane and when the buoyant vehicle 28 is submerged, they are subject to ambient water pressure. As discussed above, the buoyancy of the buoyant vehicle 28 is controlled by the selective jettisoning of the light liquid from bladder 68 or the heavy liquid from bladder 66 in measured amounts. For this purpose, the vehicle 28 is provided with a control valve 76 for the light liquid and a control valve 78 for the heavy liquid. The valves are mounted on the bulkhead 46 within the sealed chamber 48. The valves 76 and 78 are controlled by an electronic circuit 82 (FIG. 6) on the electronics board 84 which is also contained within the sealed chamber 48. The electronic circuit 82 will be described subsequently.

Since the bladders 66 and 68 are exposed to ambient water pressure, and the control valves 76 and 78 discharge into the ambient pressure, it is necessary to provide a pressure differential on the bladders to discharge the liquids into the surrounding water. For this purpose, a pressure plate 86 of circular configuration is mounted on the upper end of the plunger 62. The plunger 62 extends through the center of the plate and has an annular flange 88 engaging the plate on its upper side. The pressure plate 86 rests on the bladder 66 which, in turn, rests on the bladder 68 which is supported by the fixed compartment wall 56. A helical compression load spring 92 is disposed within the plunger 62 and is seated at its lower end on the bottom wall of the plunger. The upper end of the spring 92 bears against the lower end of a cylindrical grommet 94 which is seated in a cylindrical recess in the bulkhead 46. (The grommet 94 provides a passageway for electrical conductors, not shown in FIG. 2, which extend from the hydrophone 34 to the electronics board 84.) Thus, the load spring 92 causes the pressure plate 86 to exert a steady downward force on the bladders 66 and 68 to pressurize the liquids therein relative to the ambient seawater.

As described above, the bladders 66 and 68 are adapted to be discharged through the respective control valves 76 and 78. The control valve 76 and 78 are electromagnetic valves and, as shown in FIGS. 3 and 4, are mounted on the bulkhead 46. The valves are electrically connected by respective conductors (not shown in FIG. 3) to the electronic circuit on the circuit board 84. The control valve 76 has an inlet port 98, in the form of a tube fitting, extending through the bulkhead 46 and it has an outlet port 102 which extends to the periphery of the bulkhead and into the surrounding seawater. Similarly, control valve 78 has an inlet port 104 and an outlet port 106. A discharge extension tube 108 is connected with the outlet port 106 and conveys the heavy liquid at a suitable distance outwardly from the vehicle 28 so that the heavy liquid will not be deposited on the suspension system 36 which would tend to defeat the buoyancy control. The light liquid from the outlet port 102 disperses readily in the seawater and need not be conducted away from the vehicle 28.

The buoyant vehicle 28 carries the pressure transducer 112 which is described above. The transducer produces a depth signal voltage which increases with depth according to a known calibration.

The valves 76 and 78 are identical to each other and each is operable independently in a pulse mode between open and closed positions by an electromagnet which is energized under the control of the electronic circuit 82. The quantity of liquid that is discharged by the valve is determined by the time duration of valve opening which is computed in accordance with the need for correction of the velocity of the buoyant vehicle 28, as will be discussed below.

Figures 5, 6:
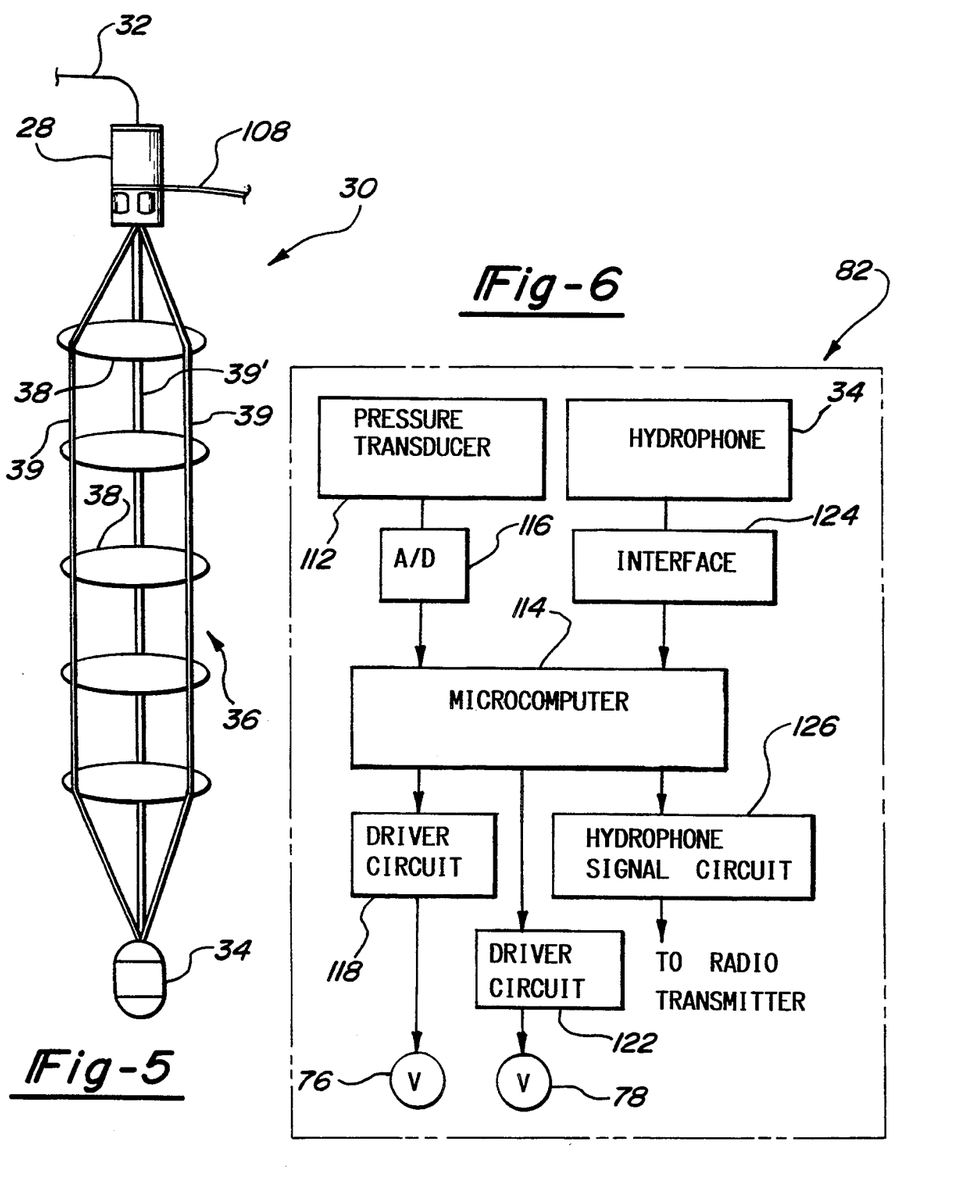
FIG. 5 is a view of the buoyant vehicle with the suspension system supporting a hydrophone in a deployed state.
FIG. 6 is a block diagram of the electronic system.

The buoyant vehicle 28 and the hydrophone 34 which is supported by the suspension system 36 from the vehicle are shown in the deployed state in FIG. 5. As discussed above, the buoyant vehicle 28 is adapted to support the hydrophone 34 through the suspension system 36 and to support a share of the fiber optic cable 32 so that the hydrophone has a predetermined average vertical velocity through the water. The vehicle must also compensate for changes in the buoyancy due to volumetric changes caused by compressibility of the system components. The buoyant vehicle 28 has a controlled variable buoyancy whereas the payload connected to it has a negative buoyancy which changes with depth. The buoyancy of the vehicle 28 is controlled by means of the valves 76 and 78 for discharging the heavy liquid and light liquid, respectively, under the control of a microcomputer in the electronic circuit 82. The electronic circuit 82 includes a microcomputer which is operated in accordance with a control program which implements a buoyancy control algorithm which will be described subsequently.

The Electronic Circuit

The electronic circuit 82 carried by the buoyant vehicle will be described with reference to FIG. 6. The electronic circuit 82, as mentioned above, is carried by the electronics board 84. It comprises a microcomputer 114 which operates under the control of a buoyancy control program which is stored in memory of the computer. The microcomputer receives depth signals from the pressure transducer 112 through an analog-to-digital (A/D) converter 116. The pressure signals are processed by the microcomputer 114 under program control to obtain a depth signal corresponding to the depth of the buoyant vehicle 28 and to obtain a rate of change of depth signal corresponding to the velocity of the vehicle 28. The microcomputer 114 processes the velocity signal to develop valve control signals which are applied through respective driver circuits 118 and 122 to the valves 76 and 78 for control of the buoyancy of the vehicle. The microcomputer 114 also receives a hydrophone signal from hydrophone 34 through an interface circuit 124. The microcomputer develops a data signal which is applied through a hydrophone signal circuit 126 and through the optical cable 32 and the cable 18 to the radio transmitter in the float 16.

The Buoyant System

The buoyant vehicle 28, the suspension system 36 and the hydrophone 34, shown in FIG. 5, in the deployed state are herein collectively called the "buoyant system" 30. The buoyant system is accurately trimmed during fabrication to achieve a desired net buoyancy. In the illustrative embodiment, the buoyant system 30 is trimmed to be about five grams buoyant at the surface in seawater having the highest expected density. Because the buoyant system is compressible it becomes neutrally buoyant at a certain operating depth in high density seawater. It would be thirty-two grams negatively buoyant at the surface in seawater having the lowest expected density. After deployment, when the buoyancy control system becomes active the buoyancy is adjusted to ensure that the buoyant system 30 stays within the selected depth range and maintains an average vertical velocity below a predetermined value, such as 0.04 knots.

The suspension system 36 of the buoyant system 30 comprises five single panel urethane dampered disks 38 which are secured to three suspension lines 39 which connect the vehicle 28 with the hydrophone 34. The suspension system 36 provides a horizontal drag force which pulls the fiber optics cable 32 from the cable spool 26. The suspension system also provides a vertical drag force in order to minimize the terminal velocity of the buoyant system 30 and to facilitate control of the vertical velocity. The suspension system 36 also provides isolation between the fiber optics cable 32 and the hydrophone so that any transient force transmitted through the cable is damped by the mass of the vehicle 28 and the suspension system 36. This damping tends to eliminate generation of "noise" on the hydrophone by the transient forces. Further, the suspension system 36 is utilized to orient the buoyant system 30 relative to the direction of seawater flow such that the discharge tube 108 is disposed at about forty-five degrees off the aft position to prevent the heavy liquid from being drawn back toward the damper disks by the vortices around the suspension. For this purpose, one of the suspension lines 39' is provided with a significantly higher drag characteristic than the other two lines 39 and the three suspension lines are non-rotatably connected with the buoyant vehicle 28.

General Description Of The Buoyancy Control Algorithm

As described above, the buoyant vehicle 28 operates to maintain the hydrophone 34 within specified maximum vertical velocities while it is within a specified depth range of a "zoom window". For example, a given sonobuoy may be adapted to operate in a zoom window at an intermediate depth range which extends between 359 to 615 feet. The buoyant vehicle 28 is set or biased to operate at a predetermined target velocity when it reaches a specified depth within the zoom window, with the objective of maintaining it within the prescribed depth range or zoom window for a predetermined minimum period of time. The target velocity is a velocity which the buoyancy control system seeks to achieve and maintain. It is preferably a velocity of small negative value, i.e. descending vertical direction. A target velocity of zero could be selected. However, a negative target velocity takes advantage of the differential between the grams per stowage volume for the heavy liquid and the light liquid and results in the use of much less of the light liquid than if the target velocity were set at zero. The light liquid is not an absolute necessity in the buoyancy control system to obtain the desired results; it is included primarily to assure against overshoot in case too much heavy liquid is released.

In general terms, the buoyancy control algorithm monitors the depth of the buoyant vehicle 28 and determines the direction and magnitude of the vertical velocity. If the velocity exceeds a predetermined threshold velocity the buoyancy control algorithm calculates how much fluid it must jettison to decelerate the vehicle to the target velocity. (The threshold velocity is defined as a vertical velocity which, if exceeded will initiate corrective action.) The threshold and target velocities are functions of the position of the buoyant vehicle 28 within the zoom window to facilitate control of depth and velocity while maintaining it within the range covered by the zoom window for the prescribed period of time.

To ensure that the buoyant vehicle 28 will be capable of remaining in the zoom window for the prescribed period of time after deployment, the buoyant system 30 should be deployed at a depth near the top of the selected zoom range. This is determined by the length of the cable 18 between the float 16 and the spool 26, as depicted in FIG. 1.

Figure 7:
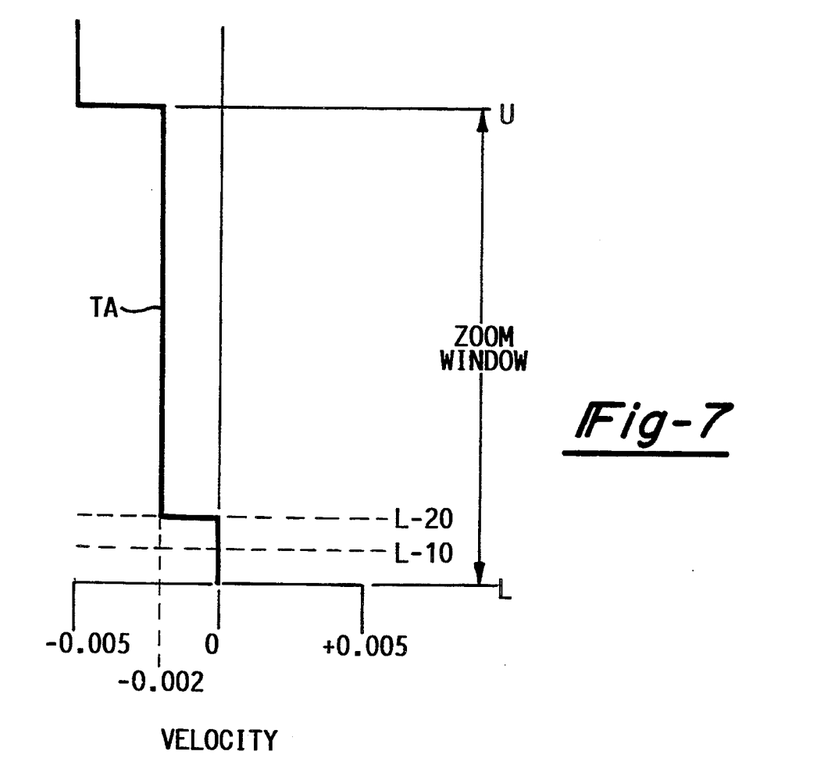
FIG. 7 is a target velocity profile.

A typical target velocity profile TA shown in the graph of FIG. 7. In this graph, the target velocity of the vehicle 28 in feet per second is represented along the X-axis and the depth is represented along the Y-axis with a 256 foot zoom window indicated between an upper boundary U and lower boundary L. It is noted that the target velocity is constant at a value of $-0.002$ feet per second starting at the upper boundary of the zoom window until it approaches the lower boundary, for example, at 20 feet above the lower boundary. When the depth of the vehicle 28 is outside of the boundary, or close to it, the target velocity is adjusted to bias it toward the zoom range. Thus, as the vehicle 28 reaches the depth L-20, the target velocity is reduced to zero and remains at zero from there to the lower boundary L. At the lower boundary L the target velocity is increased from zero to +0.005 feet per second. It is further noted that while the vehicle 28 is above the zoom window, as shown in the graph, the target velocity is set at −0.005 feet per second and reduced to −0.002 feet per second at the upper boundary. It is also noted that a depth designated L-10 is called an equilibrium depth where the positive threshold velocity is equal to the negative threshold velocity, as will be explained in the description that follows.

Figure 8:
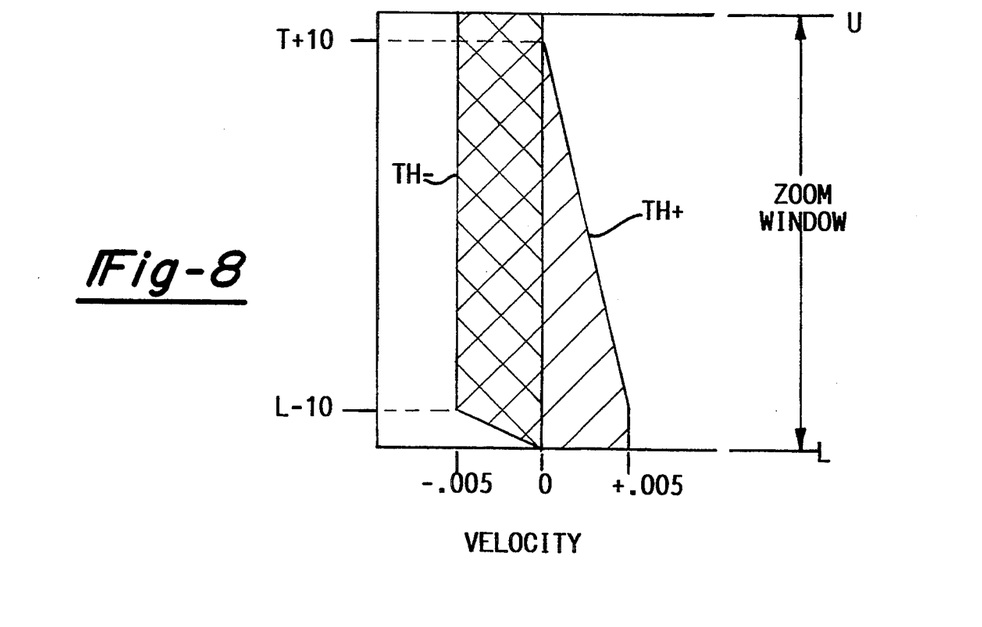
FIG. 8 is a threshold velocity profile.

Vertical velocity is the primary variable in the buoyancy control algorithm to control the depth and the velocity of the buoyant system 30. This is accomplished by the use of a threshold velocity profile with positive and negative velocity values which are incorporated in the program for control of the buoyancy of the vehicle 28. A typical threshold velocity profile is shown in the graph of FIG. 8 which includes positive and negative threshold velocities TH+ and TH−. When the velocity of the vehicle 28 exceeds either the positive or the negative threshold velocity value, the buoyancy control system initiates corrective action. The values of the positive and negative threshold velocity are programmed through the range of depths in the zoom window to have a predetermined ratio for control of the average vertical velocity and for depth maintenance of the buoyant system 30. By providing a predetermined offset between the positive and negative thresholds the buoyant system can be directed toward any desired depth at a controlled rate. For example, if the goal is to direct the buoyant system downward at an average velocity of −0.002 feet per second, the threshold of the velocity profile could set the negative threshold at −0.007 feet per second and the positive threshold at +0.005 feet per second. The average velocity will tend to converge, over time, toward the difference between the two thresholds, even if the target velocity is zero. To maintain a specific depth, the positive and negative thresholds TH+ and TH− would be made equal to each other. This is illustrated in FIG. 8 at the depth of L-10 wherein the positive and negative threshold velocities are of equal absolute values. At this depth, called the equilibrium depth, the average velocity over time will be zero. Note that at depths greater than L-10 within the zoom window, the positive threshold velocity exceeds the negative. At any depth within the upper and lower limits of the zoom window, as shown in FIG. 8, the difference in the threshold velocities will direct the vehicle 28 toward the equilibrium depth L-10.

The control system utilized with this invention is an integral feedback control system or integral controller which responds to threshold velocity and target velocity to control both the vertical velocity and the depth of the buoyant system 30. The integral feedback control system provides a corrective action at a rate proportional to the error which is implemented by dispensing an amount of either the heavy liquid or light liquid in a unit of time which is directly proportional to the vertical velocity at the beginning of the time period. The use of the integral control system has the advantage of eliminating any steady state error.

In general, in order for the controller to exert the desired corrective action, the direction and magnitude of the vertical velocity must be compared with the threshold velocity at the existing depth below the upper limit of the zoom window. With this, the controller selects either the light or the heavy liquid to be dispensed and calculates how much the wet weight of the buoyant system 30 must be changed for it to slow down to the target velocity. The relationship between vertical velocity and the wet weight is non-linear. The required wet weight change required to achieve the desired target velocity can be computed in real time according to a predetermined non-linear function or the function may be stored in a look-up table. With this information, the quantity of the selected liquid to be dispensed can be directly calculated. However, in order to dispense the calculated quantity, the instantaneous flow rate of the liquid from the bladder must be known during the time interval that the valve is open. The flow rate is a function of the internal pressure within the bladder which, in turn, is a function of the force exerted by the load spring on the bladder. By use of a precisely calibrated load spring, the force exerted thereby on the bladder can be plotted as a function of the quantity of liquid remaining in the bladder and the function can either be computed in real time or stored in a look-up table. By memorizing the accumulative quantity of liquid dispensed, the instantaneous flow rate can be calculated in real time over a given short interval with good accuracy.

Although the flow rate of the liquids is variable with temperature, good system performance can be achieved without taking temperature into account in the flow rate calculation. The temperature of the liquids will change during the first few minutes after deployment into the seawater and will then stabilize at the ambient temperature. After the temperature is stabilized, the temperature may cause a steady state error in the flow rate with the effect that the time required to change vertical velocity will be altered but without introducing substantial error in the velocity and depth control.

Although the desired control of the buoyant system 30 could be achieved as set forth above, it is preferred to compensate for errors that may be introduced in the control system by providing an adaptive system which automatically varies control parameters in response to changing conditions. Accordingly, a learning algorithm is used in the buoyancy control algorithm to provide an optimal adaptive system. This is provided during operation by continually monitoring the performance and changing the control algorithm to minimize the error until an optimum control system is realized. The learning algorithm compensates for errors in the velocity and depth control arising from both non-linearities and non-uniformities in the system. Non-linearity occurs due to the relationship between the vertical velocity and the wet weight of the buoyant system. Non-uniformity occurs primarily in variations arising from the electrical and mechanical hardware, some of which are not predictable. Flow rate is the most important and errors introduced by the equations to predict flow rate are accumulative. Further, the adaptive system is advantageous in that it tends to overcome the problem of overshoot in an integral controller which arises from attempting to prevent steady state error.

The Control Program Embodying the Buoyancy Control Algorithm

The control program embodying the buoyancy control algorithm will now be described with a learning algorithm.

At the beginning, the A/D converter 116 is read to determine the depth of the buoyancy control vehicle 28. Then a determination is made of which of the zoom mode ranges the vehicle is operating in, i.e. shallow, intermediate or deep range. Then at block 134 the last reading is integrated to obtain the current average vehicle velocity. The threshold velocity for the current depth value is determined from the programmed threshold velocity profile. Next, it is determined whether current velocity of the buoyant vehicle is within the threshold velocity. If it is, the program advances to compare the current depth and velocity with the previous reading. Then the next step 142 determines the effectiveness of the last corrective action which was taken to adjust the vehicle velocity. Based on this finding, the program executes the learning algorithm and the program loops back to block 130 to repeat the program. The program also branches to adjust the corrective action in accordance with the execution of the learning algorithm. This adjustment of the corrective action is effective to adjust the quantity of fluid release according to the learned information, If the above-mentioned test of current velocity determined that the current velocity is not within the threshold velocity, the program branches to determine the quantity and which type of fluid is to be released. Then, the above-mentioned program step for adjustment of corrective action operates to adjust the quantity according to the learned information and the program advances to release the fluid required to make the required correction of velocity.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. The method of controlling the depth of a buoyant vehicle having adjustable buoyancy below the surface of a body of water comprising the steps of:
   establishing upper and lower limits for a working range of depths,
   deploying said vehicle into the body of water,
   measuring the depth of the vehicle with reference to the surface of the body of water and determining when the upper limit of the working range is reached, and thereafter
   determining the velocity and direction of the vehicle relative to the surface,
   determining whether the velocity is outside of a predetermined range of velocities defined by predetermined ascent and descent threshold velocity values, said ascent and descent threshold velocity values being non-zero at least some depths within the body of water,
   and changing the velocity of said vehicle by adjusting the buoyancy of said vehicle to bring the velocity of said vehicle within said range of velocities.

2. The invention as defined in claim 1 including the step of:
   constructing said vehicle before it is deployed in the water so that it exhibits a predetermined negative buoyancy after it is deployed in the water.

3. The invention as defined in claim 1 wherein said vehicle carries a first liquid having a specific gravity less than that of the water and also carries a second liquid having a specific gravity greater than that of the water and wherein:
   said step of changing the velocity of the vehicle is performed by discharging a measured quantity of said first liquid if said velocity is upward and discharging a measured quantity of said second liquid if said velocity is downward.

4. The invention as defined in claim 1 wherein said working range is one of a plurality of zoom ranges of depth, and wherein:
   the step of measuring the actual depth is performed by a circuit which includes a pressure sensor carried by said vehicle,
   and wherein said circuit is capable of measuring the depth of said vehicle with higher resolution within a selected zoom range than the measurement resolution provided by said circuit for measuring the depth of said vehicle over the total distance covered by said plurality of zoom ranges.

5. The invention as defined in claim 4 wherein said circuit includes an analog to digital converter having an offset bias applied according to the selected zoom range.

6. Apparatus for controlling a depth of a vehicle submerged in a body of water comprising, in combination:
   a vehicle,
   a first bladder containing a liquid having a specific gravity greater than that of the water,
   a first valve connected between said first bladder and having a discharge passage in communication with said body of water,
   a second bladder containing a second liquid having a specific gravity less than that of the water,
   a second valve connected between said second bladder and having a discharge passage in communication with the body of water,
   said first and second bladders being subjected on the exterior thereof to the ambient pressure of the water,
   a member external of said bladders, said member being biased against at least one of said bladders such that the pressure within said one bladder is greater than the pressure of the water at the discharge passage of the one of said first and second valves corresponding to said one bladder,
   means for generating a signal corresponding to the depth of said vehicle below the surface of the water,
   means for generating a velocity signal corresponding to the velocity of the vehicle in the vertical direction,
   and means responsive to said depth signal and said velocity signal for controlling said valves to adjust the buoyancy of said vehicle for controlling the depth thereof.

7. The invention as defined in claim 6 including:
   resilient means exerting a collapsing force on said bladders.

8. The method of controlling the depth of a vehicle below the surface of a body of water comprising the steps of:
   constructing the vehicle before it is deployed in the body of water so that it exhibits a predetermined negative buoyancy in the water,
   deploying the vehicle into the body of water,
   determining the depth of the vehicle with reference to the surface of the body of water,
   determining the velocity and direction of the vehicle relative to the surface,
   establishing a descent threshold velocity and an ascent threshold velocity, said ascent and descent threshold velocities being non-zero at least some depths within the body of water, and changing the actual velocity of the vehicle when the actual velocity of said vehicle is outside of the range of velocities defined by said descent and ascent threshold velocities to bring the actual velocity of said vehicle to within said range of velocities.

9. The method of controlling the depth of a vehicle below the surface of a body of water, comprising the steps of:

constructing the vehicle before it is deployed in the body-of water so that it exhibits a predetermined negative buoyancy in the water, deploying the vehicle into the body of water, determining the depth of the vehicle with reference to the surface of the body of water, determining the velocity and direction of the vehicle-relative to the surface, establishing a descent threshold velocity and an ascent threshold velocity, changing the actual velocity of the vehicle when the actual velocity is outside of the range of velocities defined by said descent and ascent threshold velocities to bring the actual velocity of said vehicle to within said range of velocities, and selecting a desired depth to be maintained by said vehicle, wherein said establishing step includes establishing said descent and ascent threshold velocities such that they each have a value that is dependent on the depth of said vehicle, the value of said descent threshold velocity being equal to zero at a depth greater than the desired depth and the value of said ascent threshold velocity being equal to zero at a depth less than the desired depth whereby said vehicle hovers about the desired depth.

10. The intention as defined in claim 8 wherein said descent threshold velocity and said ascent threshold velocity are of different magnitudes whereby said vehicle has an average velocity having a magnitude and direction midway between said descent threshold velocity and said ascent threshold velocity.

11. The invention as defined in claim 8, further including the step of establishing a target velocity, wherein said step of changing the velocity of said vehicle includes changing the buoyancy of said vehicle to make the actual velocity of said vehicle approach said target velocity.

12. The invention as defined in claim 11, wherein said target velocity has a value that is dependent on the depth of the vehicle.

13. The method of adjusting the resolution of measurement of the depth of a submerged vehicle in accordance with a range of depths within which the depth of the vehicle is to be determined, comprising the steps of:

establishing upper and lower limits to thereby define a first working range of depths, deploying the vehicle into the body of water, measuring the depth of the vehicle with a pressure sensor that provides a first signal indicative of the depth of the vehicle, applying an offset to said first signal that is dependent on said upper limit to thereby generate a second signal, amplifying said second signal to thereby generate a third signal, converting said third signal to a digital representation thereof using an analog-to-digital converter, dividing said digital representation by the amount of amplification provided by said amplifying step to thereby generate a digital value equal to the distance of the vehicle from said upper limit, and adding the value of said upper limit to said digital value to thereby obtain the measured depth of the vehicle.

14. The method of claim 13, further comprising the step of determining when said upper limit is reached prior to performing said applying step.

15. The method of claim 13, wherein said applying step is performed prior to said amplifying step.

* * * * *